(No Model.)
O. DAHL.
PROCESS OF GENERATING ELECTRICITY BY GAS BATTERIES.
No. 411,426. Patented Sept. 24, 1889.
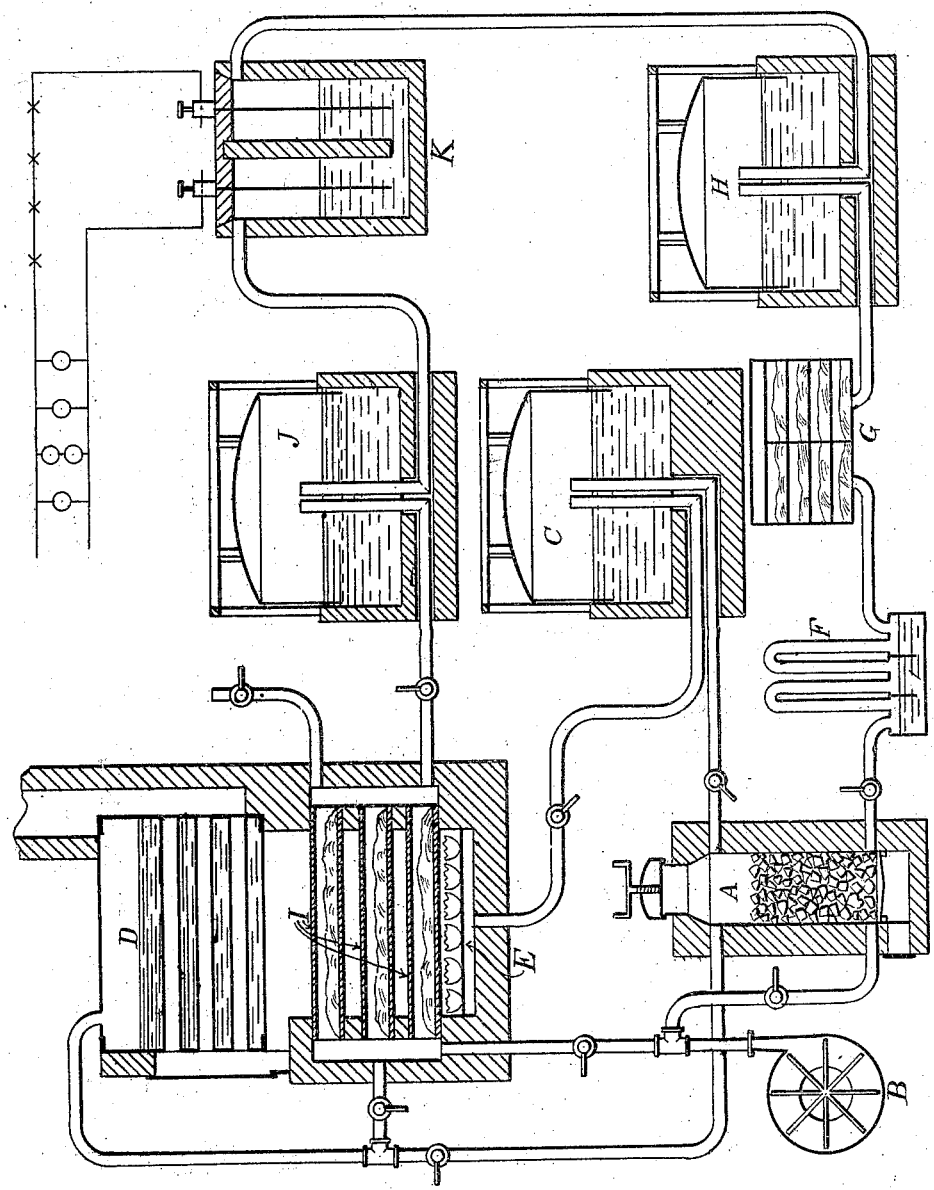
WITNESSES,
INVENTOR.

United States Patent Office.

OLOF DAHL, OF BROOKLYN, NEW YORK.

PROCESS OF GENERATING ELECTRICITY BY GAS-BATTERIES.

SPECIFICATION forming part of Letters Patent No. 411,426, dated September 24, 1889.

Application filed June 17, 1889. Serial No. 314,635. (No model.)

*To all whom it may concern:*

Be it known that I, OLOF DAHL, a subject of the King of Sweden, residing at Brooklyn, in the county of Kings and State of New York, have invented certain new and useful Improvements in the Process of Generating Electricity, of which the following is a specification.

My invention relates to a process of generating electricity from fuel—such as coke or coal—by chemical means; and its object is to produce electricity by the principle of the gas-battery in a cheap and practical manner. The principle of the gas-battery is well known to be that when hydrogen and oxygen or certain other gases are brought into contact each with one of the two electrodes of a battery immersed in acidulated water, and the electrodes are the terminals of a closed circuit, a current will flow in said circuit. The same result can be obtained with a battery in which one of the active bodies is gaseous, while the other is liquid.

Heretofore the gas-batteries have not received much application, owing to the want of cheap and practical ways of producing the gases, especially the hydrogen.

This invention contemplates an electricity-producing process which utilizes a new and economical way of producing hydrogen together with ways for manufacturing oxygen or equivalent gas, gas-battery or gas-batteries, and a working circuit or circuits.

In the drawing the figure represents the apparatus embraced by my invention in conventional form.

I will now describe the process, which is as follows:

Referring to the drawing by letter, A represents a furnace similar to those used in making water-gas, which is charged with coke, coal, or other suitable fuel. This is fired and brought to a certain temperature, more specifically defined hereinbelow, by the aid of an air-blast supplied by the blower B. While the fuel is rising to the required temperature a gaseous product, commonly known as "Siemens generator" or producer-gas, is generated and passes through the pipe to the gas-holder C, whence it may be conducted to other furnaces, hereinafter mentioned, and used as fuel or conducted to other places for sundry use. The supply of air is shut off and steam admitted to the incandescent fuel when it has reached such a temperature that the admitted steam will be decomposed into a mixture of hydrogen and carbonic acid. If the temperature of the fuel is allowed to become too high, carbonic oxide, hydrogen, and carbonic acid will be generated, or at higher temperatures only carbonic oxide and hydrogen. If the temperature of the fuel is not allowed to become high enough, part of the steam will escape undecomposed. This is, however, preferable to allowing the temperature to become too high, as the undecomposed steam is more easily separated from the mixture than is the carbonic oxide. Simultaneously or nearly simultaneously with the admitting of the steam to the incandescent fuel the outlet to the gas-holder C is cut off and the production by the decomposing of the steam is led off through a condenser F, wherein the steam that might have escaped undecomposed is condensed to water and deposited. I prefer to let the outlet to the gas-holder C be open for a moment after the steam has been admitted to the fuel, in order to let the first resulting mixture, that might contain some nitrogen, go with the producer-gas. The gas-mixture next passes to a purifier G, containing hydrate of lime, which absorbs the carbonic acid and allows the hydrogen to pass to the gas-holder H. If impurities are found to be present in the gas-mixture that enters the purifiers, they may be caused to be absorbed by suitable substances before the mixture meets the hydrate of lime—as, for instance, oxide of iron for sulphur compounds.

Oxygen may be produced by any well-known methods. I prefer to produce it by heating in earthenware tubes I, in a current of steam, sodium manganate, ($NaMnO_4$,) which then gives off free oxygen to be led off to the gas-holder J; forming caustic soda ($NaOH$) and lower oxide of manganese, ($MnO_2$.) These products, when again heated in air from the blower B, absorb oxygen, the manganese being reproduced, so that the same portion may be used over and over again. The chemical action which takes place is supposed to be explained by the following equation:

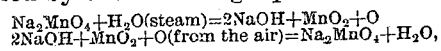

the $H_2O$ in the last equation being allowed to escape, together with the N and other components of the air. By repeating the process a regular production of oxygen can be obtained from a small quantity of chemicals. The gases having been manufactured and stored in the separate holders H and J, they are separately conducted to the opposite chambers of the battery K. The battery may be of any suitable construction and of any number of cells, and the cells may be joined in intensity or in quantity or in combinations of both. The battery shown in the drawing consists of a jar, of glass or other suitable material, air-tightly closed at the top and having a dividing-wall that has an opening at the bottom. The jar is partly filled with acidulated water reaching over the opening in the dividing-wall, closing off two separate chambers containing the gases. Each of the chambers also contains an electrode of platinum or other suitable material partly immersed in the acidulated water. The electrodes are electrically connected with each other outside the battery through the working circuit or circuits.

Instead of oxygen, certain other gases, mixture of gases, or liquids may be used.

In all the processes herein described it will be seen that the only thing of value which is consumed is the fuel. The charges of chemicals may be used over and over, and after the first charge need never be renewed. When the exhausting power of the hydrate of lime becomes exhausted, it may be revivified and reused. It is to be understood, of course, that suitable ducts or pipes connect with the several chambers, and that each is provided with a valve. All this is shown in the drawing. It will thus be seen that by keeping up the fires and attending to the supplies of steam and air a current of electricity may be continuously generated direct from the fuel.

Having thus described my invention, I claim—

1. The process of generating electricity herein described, consisting in, first, raising the temperature of a body of fuel to incandescence by the aid of atmospheric air and utilizing the gases evolved in this operation for fuel and other purposes; second, shutting off the air and admitting steam to the incandescent fuel when it has reached such a temperature that the admitted steam will be decomposed into hydrogen and carbonic acid; third, separating the carbonic acid from the hydrogen by causing hydrate of lime to absorb the carbonic acid, and conducting the hydrogen to one side of a gas-battery or gas-batteries, and, fourth, producing oxygen or equivalent gas and conducting it to the other side of the above-mentioned gas-battery or gas-batteries.

2. The process of generating electricity herein described, consisting in, first, raising the temperature of a body of fuel to incandescence by the aid of atmospheric air, and in utilizing the gases evolved in this operation for fuel or other purposes; second, shutting off the air and admitting steam to the incandescent fuel when it has reached such a temperature that the admitted steam will be decomposed and hydrogen and carbonic acid formed; third, passing the gases through condensers and purifiers to condense the steam that might have escaped undecomposed and take up possible impurities; fourth, separating the carbonic acid from the hydrogen by causing hydrate of lime to absorb the carbonic acid, and conducting the hydrogen to one side of a gas-battery or gas-batteries, and, fifth, producing oxygen or equivalent gas and conducting it to the other side of the above-mentioned gas-battery or gas-batteries.

Signed at Brooklyn, in the county of Kings and State of New York, this 12th day of June, A. D. 1889.

OLOF DAHL.

Witnesses:
ERNST F. JONSON,
AND. JONSSON.